United States Patent
Chung

(10) Patent No.: US 10,767,014 B2
(45) Date of Patent: Sep. 8, 2020

(54) METHOD FOR MANUFACTURING TRANSPARENT POLYIMIDE FILM

(71) Applicant: TAIMIDE TECH. INC., Hsinchu (TW)

(72) Inventor: Wen-Hsuan Chung, Hsinchu (TW)

(73) Assignee: TAIMIDE TECH. INC., Hsinchu (TW)

(*) Notice: Subject to any disclaimer, the term of this patent is extended or adjusted under 35 U.S.C. 154(b) by 75 days.

(21) Appl. No.: 15/786,672

(22) Filed: Oct. 18, 2017

(65) Prior Publication Data

US 2019/0112425 A1  Apr. 18, 2019

(51) Int. Cl.

| C08G 73/10 | (2006.01) |
| C08J 5/22 | (2006.01) |
| C08K 5/3432 | (2006.01) |
| C08K 5/3465 | (2006.01) |
| C08L 79/08 | (2006.01) |
| C08J 5/18 | (2006.01) |

(52) U.S. Cl.
CPC ..... *C08G 73/1021* (2013.01); *C08G 73/1039* (2013.01); *C08J 5/18* (2013.01); *C08J 5/2218* (2013.01); *C08K 5/3432* (2013.01); *C08K 5/3465* (2013.01); *C08L 79/08* (2013.01); *C08J 2379/08* (2013.01); *C08L 2201/10* (2013.01)

(58) Field of Classification Search
CPC .............. C08G 73/107; C08G 73/1039; C08G 73/1067; C08G 73/1007; C08G 73/1078
See application file for complete search history.

(56) References Cited

U.S. PATENT DOCUMENTS

| 6,040,418 A * | 3/2000 | Yamamoto ......... C08G 73/1039 528/353 |
| 2011/0311796 A1* | 12/2011 | Jung ......................... C08J 5/18 428/220 |
| 2012/0270999 A1 | 10/2012 | Hasegawa |
| 2014/0349098 A1* | 11/2014 | Hong .................... B29C 39/003 428/220 |
| 2015/0228374 A1* | 8/2015 | Adams ................. C09D 179/08 428/323 |
| 2016/0009862 A1* | 1/2016 | Jeon ....................... C08G 73/22 428/141 |
| 2017/0137571 A1 | 5/2017 | Nakayama et al. |

FOREIGN PATENT DOCUMENTS

| CN | 105295046 | * | 2/2016 |
| JP | 2011-148955 | * | 8/2011 |
| KR | 1020090051884 A | | 5/2009 |
| KR | 1020120117791 A | | 10/2012 |
| KR | 1020170016384 A | | 2/2017 |

* cited by examiner

*Primary Examiner* — Gregory Listvoyb

(74) *Attorney, Agent, or Firm* — Li & Cai Intellectual Property (USA) Office

(57) ABSTRACT

The instant disclosure relates to a method for manufacturing a transparent polyimide film, including providing a polyamic acid solution having a fluorine content more than 12%; adding a dehydrating agent and a catalyst into the polyamic acid solution, the dehydrating agent having an equivalent number equal to or larger than 3; and baking the polyamic acid solution under a temperature ranging from 250 to 350° C. for performing a chemical imidization process so that the transparent polyimide film is obtained. The transparent polyimide film has an elongation rate of more than 30% and a b* value in a CIELAB coordinate of less than 3.5.

7 Claims, 1 Drawing Sheet

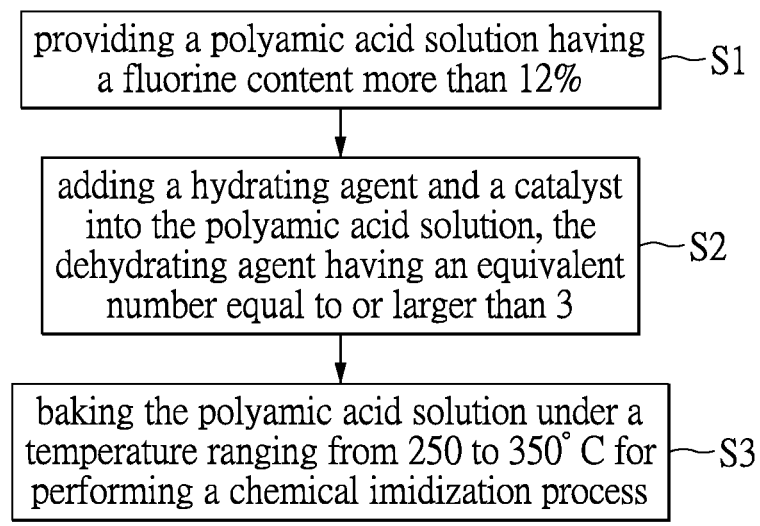

METHOD FOR MANUFACTURING TRANSPARENT POLYIMIDE FILM

BACKGROUND

1. Technical Field

The instant disclosure relates to a method for manufacturing a transparent polyimide film, and in particular, to a method including performing a chemical cyclization process towards a polyamic solution having a fluorine content larger than 12% under a temperature ranging from 250 to 350° C.

2. Description of Related Art

Methods for manufacturing polyimide films can be categorized into thermal imidization and chemical imidization (cyclization) processes. In order to increase the transparency of the polyimide film (PI film), two approaches are generally used: reducing the content of aromatic components in the molecular structure, or adding fluorine monomers to block or reduce the intermolecular or intramolecular electron transitions. Based on the approaches provided above, a transparent polyimide film can be obtained.

Generally, the transparent films in the existing art are prepared by thermal imidization processes. Different processing temperatures during the process would result in different effects, i.e., the film manufactured under lower temperature conditions has better transparency and poor elongation property, and the film manufactured under higher temperature conditions has better elongation property but yellowish color with poor transparency.

In addition, the transparent polyimide film manufactured by chemical imidization processes includes the use of a dehydrating agent and a catalyst for accelerating the reaction. However, if the ratio of the dehydrating agent and the catalyst or the temperature condition during the imidization process is not well-controlled, the transparent polyimide film prepared therefrom would have poor elongation property and yellowish color with poor transparency.

SUMMARY

The method for manufacturing a transparent polyimide film provided by the instant disclosure includes the following steps: providing a polyamic acid solution having a fluorine content more than 12%; adding a dehydrating agent and a catalyst into the polyamic acid solution, the dehydrating agent having an equivalent number equal to or larger than 3; and baking the polyamic acid solution under a temperature ranging from 250 to 350° C. for performing a chemical imidization process so that the transparent polyimide film is obtained. The transparent polyimide has an elongation rate of more than 30% and a b* value in a CIELAB (Lab color space) coordinate of less than 3.5.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

FIG. 1 is a flow chart of a method for manufacturing the transparent polyimide film provided by the instant disclosure.

DESCRIPTION OF THE EXEMPLARY EMBODIMENTS

Reference will now be made in detail to the exemplary embodiments of the instant disclosure, examples of which are illustrated in the accompanying drawings. Wherever possible, the same reference numbers are used in the drawings and the description to refer to the same or like parts.

Referring to FIG. 1, the method for manufacturing a transparent polyimide film provided by the instant disclosure includes providing a polyamic acid solution having a fluorine content more than 12% (percentage) (S1); adding a hydrating agent and a catalyst into the polyamic acid solution (S2); and baking the polyamic acid solution under a temperature ranging from 250 to 350° C. for performing a chemical imidization process (S3) so that the transparent polyimide film is obtained. The dehydrating agent has an equivalent number equal to or larger than 3. The transparent polyimide has an elongation rate of more than 30% and a b* value in a CIELAB (Lab color space) coordinate of less than 3.5, and is not easy to become yellowish.

When the temperature of the chemical imidization process is relatively high (about 350° C.), the b* value can be controlled to be less than 3.5 while maintaining the excellent transparency; when the temperature of the chemical imidization process is relatively low (about 250° C.), the elongation rate of the product can be maintained. Based on the above properties, a transparent polyimide film with a b* value in the CIELAB coordinate of less than 3.5 and not easy to become yellowish can be obtained.

The transparent polyimide film of the instant disclosure can be derived from the reaction between a fluorine-containing diamine monomer and a fluorine-containing dianhydride monomer, a fluorine-containing diamine monomer and a dianhydride monomer, or a diamine monomer and a fluorine-containing dianhydride monomer. The diamine monomer and the dianhydride monomer are used in substantially the same molarity.

In an embodiment, the diamine monomer includes 2,2'-bis(trifluoromethyl)benzidine (TFMB) and 2,2-bis [4-(4-aminophenoxy phenyl)] hexafluoropropane (HFBAPP), and the diamine monomer can further include 2,2'-bis(trifluoromethyl)-4,4'-diaminodiphenyl ether (6FODA) and 9,9-bis(3,5-dimethyl-4-amino benzeneyl) fluorine (BAFL).

In an embodiment, the dianhydride monomer is 4,4'-(4,4'-isopropylidenediphenoxy)bis-(phthalic anhydride) (BPADA) further includes 4,4'-(hexafluoroisopropylidene) diphthalic anhydride (6FDA), 3,3',4,4'-Biphenyltetracarboxylic dianhydride (BPDA) and cyclobutane-1, 2, 3, 4-tetracarboxylic dianhydride (CBDA).

In an embodiment, the dehydrating agent is a tertiary amine such as acetic anhydride.

In an embodiment, the catalyst can include pyridine such as methylpyridine and Isoquinoline.

The solvent used in the instant disclosure can be N-methylpyrrolidone (NMP), Dimethylformamide (DMF), Dimethylacetamide (DMAc) and γ-butyrolactone, etc. The solvents can be used alone or in combination.

Preparation of the Polyamic Acid (PAA) Solution

Fluorine-Containing Polyamic Acid A 45 g of DMAc (Dimethylacetamide) is placed in a reaction flask and 5.71 g (0.0178 moles) of TFMB and 9.29 g (0.0178 moles) of BPADA are added into the reaction flask. The reactants are stirred until completely dissolved. Stirring is carried out for about 16 hours to complete the reaction and form a fluorine-containing polyamic acid A solution with a viscosity of about 170,000 cps.

Fluorine-Containing Polyamic Acid B 45 g of DMAc is placed in a reaction flask, and 7.49 g (0.0145 moles) of HFBAPP and 7.51 g (0.0145 moles) of BPADA are added into the reaction flask. The reactants are stirred until completely dissolved. Stirring is carried out for 16 hours to complete the reaction and form a fluorine-containing polyamic acid B solution with a viscosity of about 100,000 cps.

Example 1

30 g of the obtained fluorine-containing polyamic acid solution A is placed in a reaction flask of about 100 mL, and about 20 g of DMAc is added for diluting the solution. The mixture is refrigerated under low temperature for about 30 minutes. Afterwards, 3 equivalents (2.6 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 250° C. for about 2 hours. The solution is baked and forms a film. The film is peeled off from the glass plate. A transparent polyimide film provided by the instant disclosure is obtained.

Example 2

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 2 equivalents (1.8 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 260° C. for about 2 hours. The solution is baked and forms a film. The film is peeled off from the glass plate. A transparent polyimide film provided by the instant disclosure is obtained.

Example 3

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 3 equivalents (2.6 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 260° C. for about 2 hours. The solution is baked and forms a film. The film is peeled off from the glass plate. A transparent polyimide film provided by the instant disclosure is obtained.

Example 4

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 2 equivalents (1.8 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 350° C. for about 2 hours. The solution is baked and forms a film. The film is peeled off from the glass plate. A transparent polyimide film provided by the instant disclosure is obtained.

Example 5

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 3 equivalents (2.6 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 350° C. for about 2 hours. The solution is baked and forms a film. The film is peeled off from the glass plate. A transparent polyimide film provided by the instant disclosure is obtained.

Example 6

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 4 equivalents (3.5 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 370° C. for about 2 hours. The solution is baked and forms a film. The film is peeled off from the glass plate. A transparent polyimide film provided by the instant disclosure is obtained.

Example 7

30 g of the obtained fluorine-containing polyamic acid solution A is placed in a reaction flask of about 100 mL and about 20 g of DMAc is added for diluting the solution. The mixture is refrigerated under low temperature for about 30 minutes. Afterwards, 3 equivalents (2.6 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 220° C. for about 2 hours. The solution is baked and forms a film. The film is peeled off from the glass plate. A transparent polyimide film provided by the instant disclosure is obtained.

Comparative Example 1

30 g of the obtained fluorine-containing polyamic acid solution B is placed in a reaction flask of about 100 mL and about 20 g of DMAc is added for diluting the solution. The mixture is refrigerated under low temperature for about 30 minutes. Afterwards, 3 equivalents (2.6 g) of a dehydrating agent (acetic anhydride) and 1 equivalent (0.8 g) of a catalyst (methylpyridine) are added and mixed with the solution. The resulted solution is coated onto a glass plate by a scrapper and baked in an oven under a fixed temperature of 80° C. for 30 minutes before increasing the temperature to 260° C. for about 2 hours. The solution is baked and forms a film. The film is peeled off from the glass plate. A transparent polyimide film is obtained.

The results of the tests carried out on the above transparent polyimide films are listed in the table below.

| item | fluorine content % | dehydrating agent equivalent number | baking temperature ° C. | transmission rate % | b*value | elongation rate % | rating |
|---|---|---|---|---|---|---|---|
| Example 1 | 12 | 3 | 250 | 88 | 1.2 | 30 | OK |
| Example 2 | 12 | 2 | 260 | 88 | 1.2 | 12 | NO |
| Example 3 | 12 | 3 | 260 | 88 | 1.3 | 32 | OK |
| Example 4 | 12 | 2 | 350 | 87 | 3.1 | 18 | NO |
| Example 5 | 12 | 3 | 350 | 87 | 3.2 | 33 | OK |
| Example 6 | 12 | 4 | 370 | 87 | 4 | 36 | NO |
| Example 7 | 12 | 3 | 220 | 87 | 1.1 | 19 | NO |
| Comparative example 1 | 10.5 | 3 | 260 | 88 | 6.8 | 22 | NO |

As shown in the table above, under the condition of the polyamic acid solution having a fluorine content more than 12%, the dehydrating agent having an equivalent number larger than 3, and a baking temperature ranging from 250 to 350° C., a transparent polyimide film having an elongation rate of more than 30% and a b*value in the CIELAB coordinate of less than 3.5 can be obtained.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A method for manufacturing a transparent polyimide film, comprising:
    providing a polyamic acid solution having a fluorine content more than 12%, and the polyamic acid solution including 4,4'-(4,4'-isopropylidenediphenoxy)bis-(phthalic anhydride);
    adding a dehydrating agent and a catalyst into the polyamic acid solution, the dehydrating agent having an equivalent number equal to or larger than 3;
    performing a chemical imidization process to form a polyimide solution; and
    baking the polyimide solution under a temperature ranging from 250 to 260° C. so that the transparent polyimide film which has a b* value in a CIELAB coordinate of less than 1.3 is obtained.

2. The method according to claim 1, wherein the polyamic acid solution contains a diamine monomer containing fluorine and a dianhydride monomer containing fluorine.

3. The method according to claim 2, wherein the diamine monomer is selected from one or a combination of two of the group consisting of 2,2'-Bis(trifluoromethyl)benzidine and 2,2-Bis [4-(4-aminophenoxy phenyl)] hexafluoropropane.

4. The method according to claim 1, wherein the dehydrating agent is acetic anhydride.

5. The method according to claim 1, wherein the catalyst includes methylpyridine and isoquinoline.

6. The method according to claim 3, wherein the polyaminic acid solution further comprises one or more of the diamine monomers selected from the group consisting of 2,2'-Bis(trifluoromethyl)-4,4'-diaminodiphenyl ether and 9,9-bis (3,5-dimethyl-4-amino benzeneyl) fluorine.

7. The method according to claim 2, wherein the polyaminic acid solution further comprises one or more dianhydride monomer selected from the group consisting of 4,4'-(hexafluoroisopropylidene)diphthalic anhydride, 3,3',4,4'-Biphenyltetracarboxylic dianhydride and cyclobutane-1,2, 3, 4-tetracarboxylic dianhydride.

* * * * *